US012736269B2

(12) United States Patent
Rakshit et al.

(10) Patent No.: US 12,736,269 B2

(45) Date of Patent: Sep. 15, 2026

(54) CARBON EMISSIONS REDUCTION USING ENVIRONMENTAL COOLING

(71) Applicant: INTERNATIONAL BUSINESS MACHINES CORPORATION, Armonk, NY (US)

(72) Inventors: Sarbajit K. Rakshit, Kolkata (IN); Sudheesh S. Kairali, Kozhikode (IN); Sudhanshu Sekher Sar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 18/055,852

(22) Filed: Nov. 16, 2022

(65) Prior Publication Data

US 2024/0159446 A1 May 16, 2024

(51) Int. Cl.

*F24F 11/00* (2018.01)
*F25D 17/08* (2006.01)

(Continued)

(52) U.S. Cl.

CPC .............. *F25D 17/08* (2013.01); *G01W 1/02* (2013.01); *G01W 1/10* (2013.01); *G16Y 20/10* (2020.01);

(Continued)

(58) Field of Classification Search

CPC .............. F25D 17/08; F25D 2317/067; F25D 2317/068; F25D 2323/0023;

(Continued)

(56) References Cited

U.S. PATENT DOCUMENTS 4,358,934 A * 11/1982 VanKirk ................ F24F 7/013 62/412
4,932,221 A * 6/1990 Shimizu .................... F25B 7/00 62/98

(Continued)

FOREIGN PATENT DOCUMENTS

CN 101413704 A * 4/2009
JP H08114347 A * 5/1996 ............... F25D 7/00
JP 2019095146 A 6/2019

OTHER PUBLICATIONS

Braun W, Free cooling with displacement ventilation, 1990, retrieved from—https://www.aivc.org/sites/default/files/airbase_4259.pdf, 13 pages (Year: 1990).*

(Continued)

*Primary Examiner* — Yongjia Pan
(74) *Attorney, Agent, or Firm* — Michael O'Keefe

(57) ABSTRACT

According to one embodiment, a method, computer system, and computer program product for item temperature maintenance is provided. The embodiment may include capturing weather information related to current and predicted weather conditions. The embodiment may also include identifying a period of time when the captured weather information indicates an outdoor temperature satisfies a temperature threshold. The embodiment may further include calculating a thermal advantage of utilizing outdoor air to supplement a normal process of a thermodynamic device. The embodiment may also include, in response to the thermal advantage satisfying a threshold, performing supplementation of the normal process of the thermodynamic device.

11 Claims, 3 Drawing Sheets

(51) Int. Cl.
*G01W 1/02* (2006.01)
*G01W 1/10* (2006.01)
*G16Y 20/10* (2020.01)

(52) U.S. Cl.
CPC .. *F25D 2317/067* (2013.01); *F25D 2317/068* (2013.01); *F25D 2323/0023* (2013.01); *F25D 2323/0024* (2013.01); *F25D 2323/0026* (2013.01)

(58) Field of Classification Search
CPC ..... F25D 2323/0024; F25D 2323/0026; F25D 29/00; F25D 2500/04; F25D 2700/14; F25D 1/00; G01W 1/02; G01W 1/10; G16Y 20/10; F24F 2011/0006; F24F 11/58; F24F 2110/12; F24F 2130/10; F24F 11/30; F24F 11/62; F24F 11/46; F24F 2011/0002; F24F 2140/60; F24F 11/0001; Y02B 30/54; G05B 15/02
See application file for complete search history.

(56) References Cited

U.S. PATENT DOCUMENTS

| | | | | |
|---|---|---|---|---|
| 5,239,834 | A * | 8/1993 | Travers | F25D 16/00 62/203 |
| 8,567,204 | B2 * | 10/2013 | Seem | G05D 23/1917 700/32 |
| 9,080,801 | B2 * | 7/2015 | Arjomand | F24F 1/027 |
| 9,587,840 | B2 * | 3/2017 | Thomas | F25B 40/00 |
| 9,702,572 | B2 * | 7/2017 | Lee | F24F 5/0046 |
| 10,267,529 | B2 * | 4/2019 | Nickel | F24F 11/30 |
| 11,156,978 | B2 * | 10/2021 | Johnson, Jr. | F24F 11/76 |
| 11,237,537 | B2 * | 2/2022 | Sipe | F24F 11/46 |
| 11,306,932 | B2 * | 4/2022 | Saunders | F24F 11/30 |
| 2002/0090908 | A1 * | 7/2002 | Estepp | F24F 11/745 454/236 |
| 2009/0013703 | A1 * | 1/2009 | Werner | F24F 5/0046 62/180 |
| 2010/0307171 | A1 * | 12/2010 | Hamann | F25B 25/00 62/235.1 |
| 2013/0124003 | A1 * | 5/2013 | Lehman | H05K 7/20836 700/300 |
| 2016/0255969 | A1 | 9/2016 | High | |
| 2017/0198933 | A1 * | 7/2017 | Erpelding | G05B 19/0426 |
| 2019/0063765 | A1 * | 2/2019 | Arjomand | F24F 1/022 |
| 2019/0257534 | A1 * | 8/2019 | Ridder | F24F 11/46 |
| 2019/0338979 | A1 * | 11/2019 | Ray | F24F 11/30 |
| 2020/0263899 | A1 * | 8/2020 | Sethuraj | F24F 11/70 |
| 2021/0356927 | A1 * | 11/2021 | Johnson, Jr. | F24F 11/56 |
| 2022/0120468 | A1 * | 4/2022 | Burks, III | F24F 11/62 |

OTHER PUBLICATIONS

Tony Komljanec, Energy efficient free cooled telecommunications shelter, 2014, retrieved from—https://ieeexplore.ieee.org/stamp/stamp.jsp?tp=&arnumber=6972136&tag=1, 9 pages (Year: 2014).*

Best Practices for Air-Side Economizers Operation and Maintenance, May 15, 2021, retrieved from—https://www.pnnl.gov/projects/om-best-practices/air-side-economizers, 20 pages (Year: 2021).*

Reid Hart, Dan Morehouse, Will Price, Eugene Water, The Premium Economizer: An Idea Whose Time Has Come, 2006, retrieved from—https://www.aceee.org/files/proceedings/2006/data/papers/SS06_Panel3_Paper09.pdf, 13 pages (Year: 2006).*

Sang-Woo Ham, Min-Hwi Kim, Byung-Nam Choi, Jae-Weon Jeong, Energy saving potential of various air-side economizers in a modular data center, 2014, retrieved from—https://www.sciencedirect.com/science/article/pii/S0306261914011167?ref=pdf_download&fr=RR-2&rr=91d543fe9a997a4d, 18 pages (Year: 2014).*

Jennifer King, Christopher Perry, Smart Buildings: Using Smart Technology to Save Energy in Existing Buildings, Feb. 2017, retrieved from—https://www.aceee.org/sites/default/files/publications/researchreports/a1701.pdf, 18 pages (Year: 2017).*

Aprilaire 8145, Jul. 8, 2020, retrieved from—https://rp.widen.net/content/yyl7hzkhno/pdf/aprilaire-8145-8145nc-ventilator-installation-guide-operating-instructions-B2208589.pdf, 10 pages (Year: 2020).*

Broan MD8TU, Mar. 11, 2020, retrieved from https://cdn.designair.com/Resources/BROANNINST00275.pdf, 9 pages (Year: 2020).*

What's the Purpose of a Fresh Air Intake?, Aug. 23, 2022, retrieved from—https://www.blackhillsinc.com/blog/whats-the-purpose-of-a-fresh-air-intake/, 5 pages (Year: 2022).*

"Pneumatic HVAC Systems/Fail-safe Valves/HELP", Oct. 20, 2007, retrieved from—https://boards.straightdope.com/t/pneumatic-hvac-systems-fail-safe-valves-help/423374, 5 pages (Year: 2007).*

Disclosed Anonymously, "Robotic Product Placement Based on Environmental Conditions for Profit Optimization," IP.com, IP.com No. IPCOM000263651D, IP.com Publication Date: Sep. 23, 2020, 5 pages.

Disclosed Anonymously, "System and Method for Dynamically Changing Product Placement in Physical Stores," IP.com, IP.com No. IPCOM000262582D, IP.com Publication Date: Jun. 12, 2020, 7 pages.

James et al., "The food cold-chain and climate change," Science Direct, Food Research International, vol. 43, Issue 7, Aug. 2010, https://www.sciencedirect.com/science/article/abs/pii/S0963996910000566, 14 pages.

Meneghetti et al., "Greening the food supply chain: an optimisation model for sustainable design of refrigerated automated warehouses," International Journal of Production Research, Downloaded Dec. 18, 2014, https://www.ttandfonline.com/doi/abs/10.1080/00207543.2014.985449, 22 pages.

Mylona et al., "Coupling night ventilative and active cooling to reduce energy use in supermarkets with high refrigeration loads," Science Direct, Energy and Buildings, vol. 171, Jul. 15, 2018, https://www.sciencedirect.com/science/article/pii/S0378778818302974, 16 pages.

Mylona et al., "Frozen food retail: Measuring and modelling energy use and space environmental systems in an operational supermarket," Science Direct, Energy and Buildings, vol. 144, Jun. 1, 2017, https://www.sciencedirect.com/science/article/pii/S0378778817309544, 40 pages.

* cited by examiner

CARBON EMISSIONS REDUCTION USING ENVIRONMENTAL COOLING

BACKGROUND

The present invention relates generally to the field of computing, and more particularly to carbon emissions reduction.

Climate change relates to the long-term shift in temperatures and weather patterns. The burning of fossil fuels for electricity generation is a man-made influence that increases the impacts of climate change. Carbon emissions reduction focuses on reducing the release of damaging carbon-based gases into the environment and atmosphere to temper the impact of climate change. Carbon emissions reduction is performed through a variety of ways including, but not limited to, cleaner forms of energy (e.g., renewable energy sources), improved energy efficiency of existing technologies, reducing carbon causing gases, and carbon capture techniques.

SUMMARY

According to one embodiment, a method, computer system, and computer program product for item temperature maintenance is provided. The embodiment may include capturing weather information related to current and predicted weather conditions. The embodiment may also include identifying a period of time when the captured weather information indicates an outdoor temperature satisfies a temperature threshold. The embodiment may further include calculating a thermal advantage of utilizing outdoor air to supplement a normal process of a thermodynamic device. The embodiment may also include, in response to the thermal advantage satisfying a threshold, performing supplementation of the normal process of the thermodynamic device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
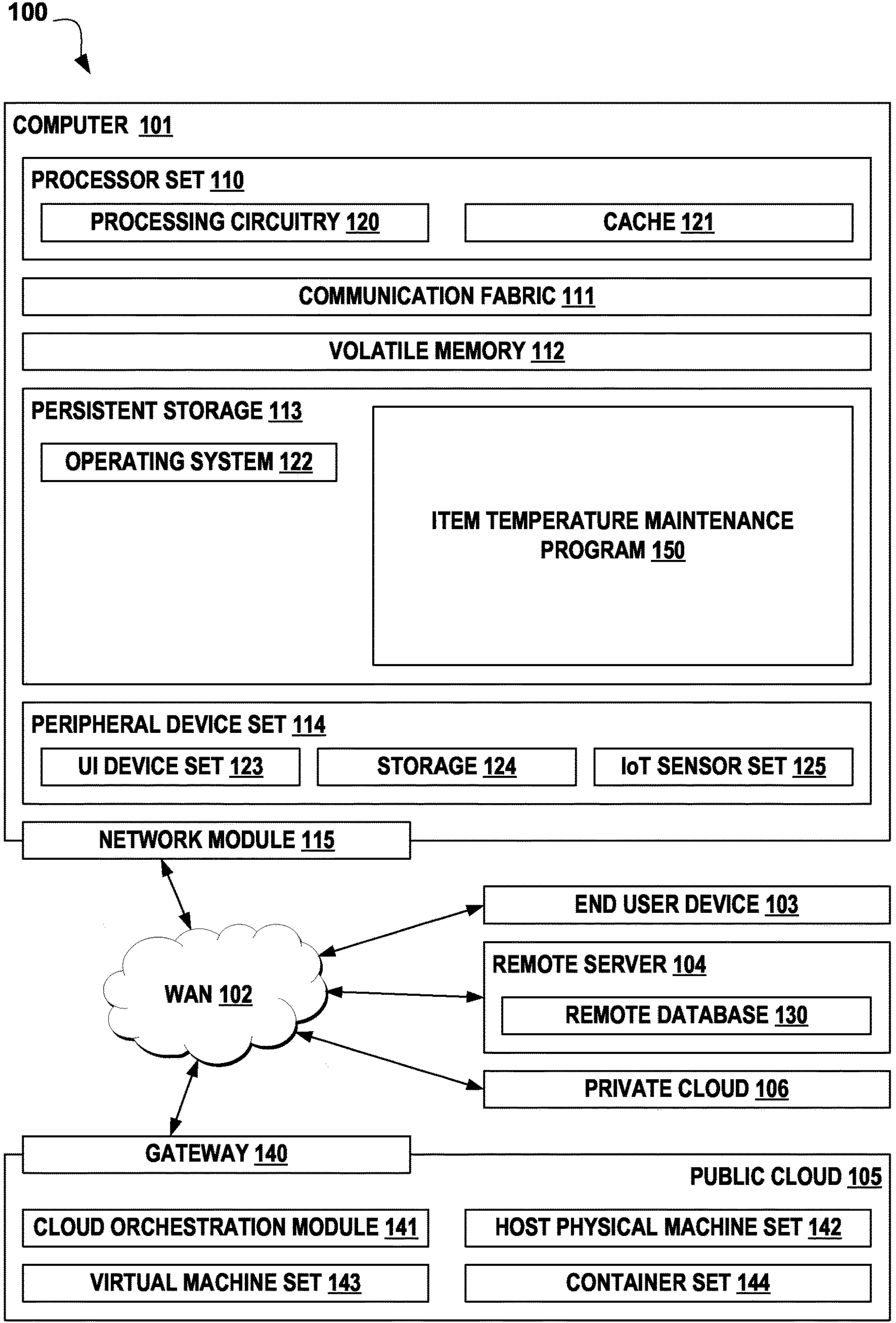
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to carbon emissions reduction. The following described exemplary embodiments provide a system, method, and program product to, among other things, reduce a carbon footprint through time-window-based, dynamic use of exterior air to cool chilled or frozen products. Therefore, the present embodiment has the capacity to improve the technical field of carbon emissions reduction by implementing the use of exterior air satisfying a threshold to aid in refrigeration of chilled or frozen items rather than solely relying on electricity-based refrigeration methods.

As previously described, climate change relates to the long-term shift in temperatures and weather patterns. The burning of fossil fuels for electricity generation is a man-made influence that increases the impacts of climate change. Carbon emissions reduction focuses on reducing the release of damaging carbon-based gases into the environment and atmosphere to temper the impact of climate change. Carbon emissions reduction is performed through a variety of ways including, but not limited to, cleaner forms of energy (e.g., renewable energy sources), improved energy efficiency of existing technologies, reducing carbon causing gases, and carbon capture techniques.

Many items and systems in industrial, commercial, and residential settings need refrigeration to maintain operation and/or preserve quality. Proper cooling is required to maintain these temperature demands. However, situations exist where one temperature-controlled environment competes with another temperature-controlled environment to the detriment of electrical demands. For example, a building may house a storage freezer to preserve certain items but is also required to a minimum temperature in other areas in winter months to satisfy comfortable human habitation due to below freezing temperatures outdoors. Therefore, the colder temperature-controlled environment is actively competing against the warmer temperature-controlled environment when performing basic operation that results in a waste of electrical effort and an increase in carbon footprint. As such, it may be advantageous to, among other things, utilize the tempered air of an exterior environment to aid in the cooling of a temperature-controlled, indoor environment.

According to one embodiment, an item temperature maintenance program may utilize exterior air to supplement traditional processes of a thermodynamic device when weather conditions satisfied preconfigured conditions. In order to facilitate the usage of exterior air, the item temperature maintenance program may utilize a ventilation system and/or a door mechanism that allows the exterior air to enter a thermodynamic device (e.g., a cooling device, such as a refrigerator or freezer) when weather conditions satisfy certain criteria (e.g., below freezing temperatures) thereby supplementing artificial cooling with natural air. Upon determining that the exterior weather conditions are approaching failure of the certain criteria, the item temperature maintenance program may disengage, close, and/or otherwise eliminate exposure of the thermodynamic device to the exterior weather conditions. In at least one embodiment, the item temperature maintenance program may utilize a failsafe system that automatically eliminates exposure of the thermodynamic device to the exterior weather conditions and/or provides a notification to one or more administrators of a failure condition should the item temperature maintenance program fail to disengage or close properly.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as item temperature maintenance program 150. In addition to item temperature maintenance program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and item temperature maintenance program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in item temperature maintenance program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in item temperature maintenance program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the item temperature maintenance program 150 may trigger the connection or opening of a gateway mechanism to expose a thermodynamic device to exterior air when the exterior temperature satisfies a preconfigured threshold. In at least one embodiment, the gateway mechanism may, for example, be a door, a valve, a ventilation tube with a hinged flap, or any other mechanism capable of connecting the thermodynamic device to an exterior air source that also includes a device capable of engaging or disengaging air flow from the exterior air source. In at least one embodiment, the thermodynamic device may be any device capable of performing a thermodynamic process, such as a refrigeration device capable of removing heat from a contained environment and expelling the removed heat to another environment, thereby cooling the contained environment. The thermodynamic device may include, but is not limited to, a refrigerator, a freezer, an air conditioner, and a heat pump.

The item temperature maintenance program 150 may monitor current and forecasted exterior weather conditions to identify a period of time when the exterior temperature satisfies a preconfigured threshold for a set period of time. Once the period of time is identified and begins, the item temperature maintenance program 150 may open the gateway mechanism thereby allowing the exterior air at the threshold temperature into the thermodynamic device. The item temperature maintenance program 150 may thereby monitor the temperature within the contained environment of the thermodynamic device and exterior temperature to ensure threshold levels are maintained. When the exterior temperature and/or the contained environment temperature no longer satisfy their respective thresholds, the item temperature maintenance program 150 may disengage the gateway mechanism.

Furthermore, notwithstanding depiction in computer 101, the item temperature maintenance program 150 may be stored in and/or executed by, individually or in any combination, end user device 103, remote server 104, public cloud 105, and private cloud 106. The item temperature maintenance method is explained in more detail below with respect to FIGS. 2 and 3.

Figure 2:
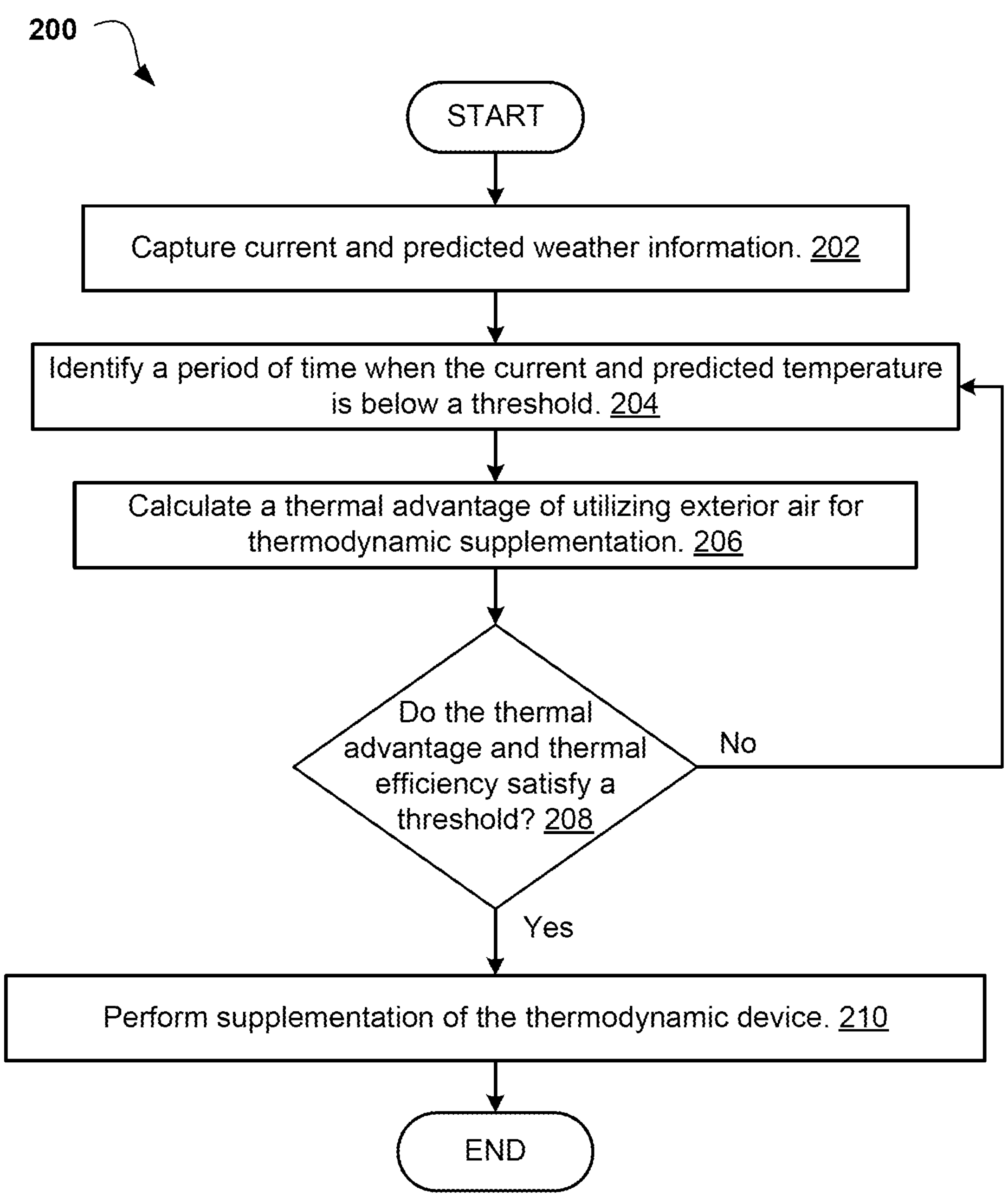
FIG. 2 illustrates an operational flowchart for an item temperature maintenance process according to at least one embodiment.

Referring now to FIG. 2, an operational flowchart for an item temperature maintenance process 200 is depicted according to at least one embodiment. At 202, the item temperature maintenance program 150 captures current and predicted weather information. The current and predicted weather information may include, but is not limited to, temperature, wind speed, precipitation type, precipitation length of time, precipitation amount, pressure, cloud cover, ultraviolet radiation (UV) index, air quality, and air particulate level. The item temperature maintenance program 150 may obtain the current and predicted weather information from a third-party repository, such as remote database 130. In another embodiment, the item temperature maintenance program 150 may obtain the current weather information from one or more IoT sensors within IoT sensor set 125 while obtaining the predicted weather information from remote database 130. The one or more IoT sensors utilized to obtain the current weather information may include a thermometer, a barometer, an anemometer, and the like.

Then at 204, the item temperature maintenance program 150 identifies a period of time when the current and predicted temperature is below a threshold. In order to utilize outdoor air to properly provide supplementary cooling to a thermodynamic device, the item temperature maintenance program 150 may require a specific period of time that the outdoor temperature is below a threshold level. The threshold level may be unique for each thermodynamic device. For example, a freezer may require a lower temperature than a refrigerator. Therefore, the item temperature maintenance program 150 may analyze the current and predicted temperature for a period of time when the outdoor temperature will remain below the specific threshold. For example, if the thermodynamic device is a freezer, the item temperature maintenance program 150 may identify a period of time when the outdoor temperature is below 0° F. (−18° C.), which is the recommended temperature for storing frozen food items.

In at least one embodiment, the item temperature maintenance program 150 may identify a temperature range at which the current and predicted temperature must remain. For example, if the thermodynamic device is a refrigerator, the item temperature maintenance program 150 may determine an upper bound temperature threshold and a lower bound temperature threshold at which the outdoor temperature must remain in order to ensure the integrity of the items stored within the refrigerator.

Next, at 206, the item temperature maintenance program 150 calculates a thermal advantage of utilizing exterior air for thermodynamic. Thermal advantage may relate to the net value of energy reduction to utilize outside air to supplement cooling of the thermodynamic device compared to cooling through the thermodynamic device alone. When the thermodynamic device is a refrigeration device performing normal operations, the refrigeration device extracts heat from the air within the refrigerated space to lower the temperature to adequate levels for storage. This heat is then expelled to the surrounding environment outside the refrigeration device. However, since the refrigeration device is, typically, located in an environment with a temperature higher than the cooled space within the refrigeration device, normal operation of the refrigeration device may work against other efforts to maintain the comfortable temperature of space surrounding the refrigeration device. For example, if the refrigeration device is a household refrigerator within a residential kitchen, the refrigerator may be cooling its interior and expelling heated air into the surrounding kitchen environment. However, the surrounding kitchen environment may itself be a climate-controlled space working to maintain a temperature comfortable for occupants. Therefore, the refrigerator and the HVAC system working to maintain a preconfigured temperature of the cooled storage space and climate-controlled space, respectively, may work against each other. As such, utilization of outside air may result in a thermal advantage to using normal cooling or heating capabilities of a thermodynamic device. The thermal advantage may thus be calculated as the resultant conservation of energy through non-use of the thermodynamic device cooling capabilities in favor of outside air.

Furthermore, the thermal advantage may be affected by the specific temperature as well as other weather metrics (e.g., humidity and air pressure). Therefore, the thermal advantage may be calculated as the total energy consumed through normal operation of the thermodynamic device without outside air supplementation minus the total energy consumed by the thermodynamic device with outside air supplementation at a specific temperature as determined by the captured current and predicted weather information.

Next, at 208, the item temperature maintenance program 150 determines whether the calculated thermal advantage satisfies a threshold value. Once calculated, the item temperature maintenance program 150 may determine if the thermal advantage satisfies a threshold that would demonstrate the use of outside air to supplement cooling of the refrigeration device is advantageous. The threshold may be preconfigured to be any value more advantageous than the calculated thermal advantage. If the item temperature maintenance program 150 determines the calculated thermal advantage satisfies the threshold (step 208, "Yes" branch), then the item temperature maintenance process 200 may proceed to step 210 to perform supplementation of the thermodynamic device. If the item temperature maintenance program 150 determines the calculated thermal advantage does not satisfy the threshold value (step 208, "No" branch), then the item temperature maintenance process 200 may return to step 204 to identify a period of time when the current and predicted temperature is below a threshold value.

Then, at 210, if the thermal advantage satisfies a threshold value, the item temperature maintenance program 150 performs supplementation of the thermodynamic device. The item temperature maintenance program 150 may provide supplementation of the thermodynamic device through any number of mechanisms that provide the thermodynamic device access to outside air at the threshold temperature. For example, the thermodynamic device may be connected to an outdoor air source through an insulated ventilation duct. The insulated ventilation duct may be securely connected to the thermodynamic device through any number of connections that prevent the escape of temperature and air. Furthermore, the insulated ventilation duct may be equipped with a regulator mechanism that engages and disengages to allow the for free passage of outdoor air. For example, the regulator mechanism may be a flue, a vent, a valve, or any other mechanism that prevent the passage of air when in a closed position but allow the free flow of air in the open position. In one or more other embodiments, the air regulator mechanism may be insulated so as to prevent temperature loss to the environment outside the cooled storage area of the thermodynamic device.

In another embodiment, the thermodynamic device may include a doorway-type connection to expose the cooled storage area of the refrigeration device to outside air that is regulated by the item temperature maintenance program 150. In such an embodiment, the thermodynamic device may be juxtaposed or aligned along an exterior wall of a building so that the doorway-type connection may be opened or closed according to the determination in step 208. For example, a cold case refrigerator in a grocery store may be aligned along an exterior wall and, when the item temperature maintenance program 150 determines the temperature is suitable for supplementation with outside air, the item temperature maintenance program 150 may open one or more doorway mechanisms to allow the outdoor air to enter the cold case refrigerator.

In at least one other embodiment, the mechanism used to allow air into the thermodynamic device, such as the insulated ventilation duct or doorway-type connection discussed above, may include a filter-type device that prevents any number of contaminants from entering the storage area of a thermodynamic device. The filter-type device may include, but is not limited to, a mesh filter, a HEPA filter, a carbon filter, a UV light filter, an electrostatic filter, a washable filter, a media filter, a spun glass filter, and a pleated filter.

In yet another embodiment, the mechanism used to allow air into the thermodynamic device may include a forced air mechanism, such a bladed or bladeless fan. For example, if a refrigeration device includes a ventilation duct to expose the cooled storage area to outside air, the ventilation duct may include a three-blade fan within the duct to force the outside air into the cooled storage area based on direction provided by the item temperature maintenance program 150.

In still another embodiment, the mechanism used to allow air into the thermodynamic device may have an automatic closing function if power or communication to the item temperature maintenance program 150 is lost. For example, if a refrigeration device and the item temperature maintenance program 150 lost electrical power due to an outage or that the user disconnected the refrigeration device from a power source when the refrigeration mechanism was connected to the outdoor air source, the mechanism used to allow air into the refrigeration device may automatically close to prevent outside air from continuing to enter the refrigeration device. This automatic closing mechanism may aid in the preservation of the storage items within the cooled storage area after cooling functionality is ceased. The automatic closing function may be facilitated through any number of different closing mechanisms, such as, but not limited to, a spring, a magnet, a pneumatics, a piston, an air pressure mechanism, a vacuum mechanism, or any combination thereof. Additionally, the automatic closing function may be engaged when the item temperature maintenance program 150 determines outdoor air is to be allowed into the storage area and disengaged when the item temperature maintenance program 150 determines outdoor air is not longer to be allowed into the storage area, when the thermodynamic device loses connection to a power source, and/or when the item temperature maintenance program 150 loses a communication connection, via WAN 102, to the closing mechanism. In at least one embodiment, the regulator mechanism may be an iteration of computer 101 due to connection capabilities to the item temperature maintenance program 150. However, in one or more other embodiments, the regulator mechanism may rather be a peripheral device within peripheral device set 114 to the thermodynamic device or end user device 103.

Figure 3:
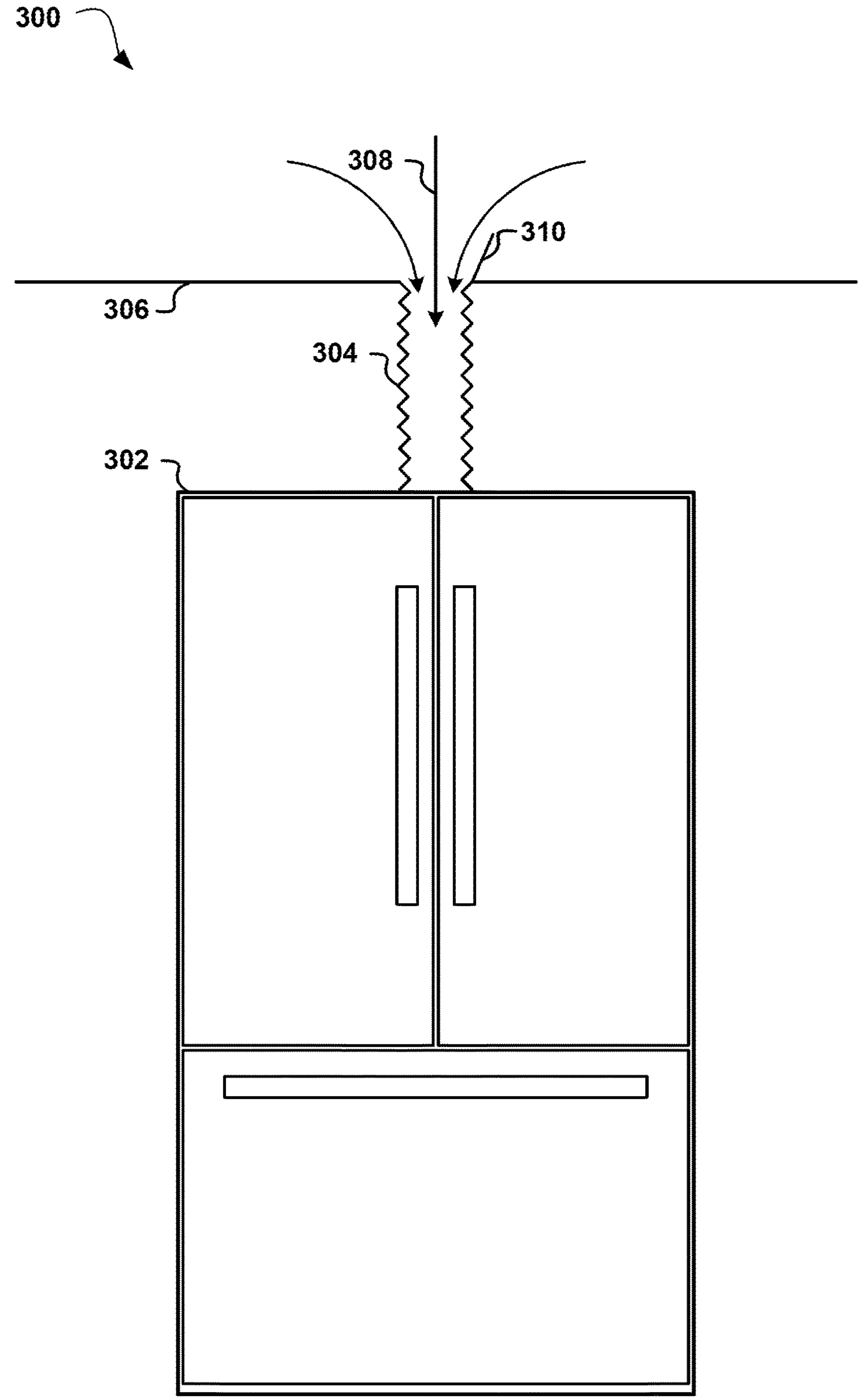
FIG. 3 illustrates a block diagram of refrigeration supplementation according to at least one embodiment.

Referring now to FIG. 3, a block diagram of refrigeration supplementation 300 is depicted according to at least one embodiment. In at least one embodiment, a refrigeration device 302 may utilize a ventilation duct 304 connected to an exterior wall 306 of a building or other enclosure that allows outdoor air 308 to enter into the cooled storage area of the refrigeration device 302. As previously described, a regulator mechanism 310 may be connected to one end of the ventilation duct 304 that the item temperature maintenance program 150 may open when the identified period of time from step 204. Also as previously described, the regulator mechanism 310 may be automatically closed when the period of time ends, when the refrigeration device 302 loses power, or when the door-type mechanism loses connection to the item temperature maintenance program 150.

It may be appreciated that FIGS. 2 and 3 provide only an illustration of one implementation and do not imply any limitations with regard to how different embodiments may be implemented. Many modifications to the depicted environments may be made based on design and implementation requirements. For example, although many of the examples provided relate to a refrigeration device, the item temperature maintenance program 150 may be utilized with any type of thermodynamic device, such as to provide supplemental heating to keep an item warm when the outdoor temperature is above a threshold value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:

capturing weather information related to current and predicted weather conditions obtained from a third-party repository;

identifying a period of time when the captured weather information indicates an outdoor temperature satisfies a temperature threshold;

calculating a thermal advantage of utilizing outdoor air to supplement a normal process of a thermodynamic device connected to an outdoor air source by an insulated ventilation duct, wherein the thermal advantage is calculated as a first total energy consumption by the thermodynamic device without outside air supplementation minus a second total energy consumption by the thermodynamic device with outside air supplementation at a specific temperature, wherein the specific temperature is captured by current and predicted weather information; and in response to the thermal advantage satisfying a threshold, performing supplementation of the normal process of the thermodynamic device, wherein the supplementation comprises engaging a regulator mechanism that allows outdoor airflow to a storage area of the thermodynamic device, comprises a filter-type device preventing contaminants from entering a storage area of the thermodynamic device, and automatically closes, using pneumatics, when a communication connection to the thermodynamic device is lost, and wherein the threshold is unique for each thermodynamic device.

2. The method of claim 1, where the thermodynamic device is connected to an outdoor air source by a doorway-type connection.

3. The method of claim 1, wherein a connection of the thermodynamic device to an outdoor air source includes a filter-type device and a forced air mechanism.

4. The method of claim 1, wherein the current weather conditions are captured using one or more Internet of Things sensors communicatively coupled to the thermodynamic device.

5. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

capturing weather information related to current and predicted weather conditions obtained from a third-party repository;

identifying a period of time when the captured weather information indicates an outdoor temperature satisfies a temperature threshold;

calculating a thermal advantage of utilizing outdoor air to supplement a normal process of a thermodynamic device connected to an outdoor air source by an insulated ventilation duct, wherein the thermal advantage is calculated as a first total energy consumption by the thermodynamic device without outside air supplementation minus a second total energy consumption by the thermodynamic device with outside air supplementation at a specific temperature, wherein the specific temperature is captured by current and predicted weather information; and in response to the thermal advantage satisfying a threshold, performing supplementation of the normal process of the thermodynamic device, wherein the supplementation comprises engaging a regulator mechanism that allows outdoor airflow to a storage area of the thermodynamic device, comprises a filter-type device preventing contaminants from entering a storage area of the thermodynamic device, and automatically closes, using pneumatics, when a communication connection to the thermodynamic device is lost, and wherein the threshold is unique for each thermodynamic device.

6. The computer system of claim 5, where the thermodynamic device is connected to an outdoor air source by a doorway-type connection.

7. The computer system of claim 5, wherein a connection of the thermodynamic device to an outdoor air source includes a filter-type device and a forced air mechanism.

8. The computer system of claim 5, wherein the current weather conditions are captured using one or more Internet of Things sensors communicatively coupled to the thermodynamic device.

9. A computer program product, the computer program product comprising:

one or more computer-readable tangible storage medium and program instructions stored on at least one of the one or more tangible storage medium, the program instructions executable by a processor capable of performing a method, the method comprising:

capturing weather information related to current and predicted weather conditions obtained from a third-party repository;

identifying a period of time when the captured weather information indicates an outdoor temperature satisfies a temperature threshold;

calculating a thermal advantage of utilizing outdoor air to supplement a normal process of a thermodynamic device connected to an outdoor air source by an insulated ventilation duct, wherein the thermal advantage is calculated as a first total energy consumption by the thermodynamic device without outside air supplementation minus a second total energy consumption by the thermodynamic device with outside air supplementation at a specific temperature, wherein the specific temperature is captured by current and predicted weather information; and in response to the thermal advantage satisfying a threshold, performing supplementation of the normal process of the thermodynamic device, wherein the supplementation comprises engaging a regulator mechanism that allows outdoor airflow to a storage area of the thermodynamic device, comprises a filter-type device preventing contaminants from entering a storage area of the thermodynamic device, and automatically closes, using pneumatics, when a communication connection to the thermodynamic device is lost, and wherein the threshold is unique for each thermodynamic device.

10. The computer program product of claim 9, where the thermodynamic device is connected to an outdoor air source by a doorway-type connection.

11. The computer program product of claim 9, wherein a connection of the thermodynamic device to an outdoor air source includes a filter-type device and a forced air mechanism.

* * * * *